(12) United States Patent
Feng et al.

(10) Patent No.: US 10,809,417 B2
(45) Date of Patent: Oct. 20, 2020

(54) THREE-DIMENSIONAL ANALOG SIMULATION TEST SYSTEM FOR GAS-LIQUID COUNTERCURRENT IN ABANDONED MINE GOAF

(71) Applicant: Taiyuan University of Technology, Taiyuan, Shanxi (CN)

(72) Inventors: Guorui Feng, Shanxi (CN); Chunwang Zhang, Shanxi (CN); Zhixin Jin, Shanxi (CN); Rui Gao, Shanxi (CN); Shengyong Hu, Shanxi (CN); Zhen Li, Shanxi (CN); Jiaqing Cui, Shanxi (CN); Cheng Song, Shanxi (CN); Xiaohong Niu, Shanxi (CN)

(73) Assignee: Taiyuan University of Technology, Taiyuan (CN)

( * ) Notice: Subject to any disclaimer, the term of this patent is extended or adjusted under 35 U.S.C. 154(b) by 154 days.

(21) Appl. No.: 16/234,497

(22) Filed: Dec. 27, 2018

(65) Prior Publication Data
US 2020/0088907 A1 Mar. 19, 2020

(30) Foreign Application Priority Data
Sep. 18, 2018 (CN) .......................... 2018 11 087726

(51) Int. Cl.
*G01V 99/00* (2009.01)
*E21C 39/00* (2006.01)
(Continued)

(52) U.S. Cl.
CPC ............ *G01V 99/005* (2013.01); *E21C 39/00* (2013.01); *G05B 11/01* (2013.01); *G05D 16/2066* (2013.01)

(58) Field of Classification Search
CPC ....... G01V 99/005; E21C 39/00; G05B 11/01; G05D 16/2066; E21F 1/02; G01N 33/24
See application file for complete search history.

(56) References Cited

U.S. PATENT DOCUMENTS

2009/0306898 A1* 12/2009 Anschutz ................. G01N 3/10
702/11
2019/0078987 A1* 3/2019 Zhang ..................... G01N 33/24

FOREIGN PATENT DOCUMENTS

CN 202485891 U 10/2012
CN 203443762 U 2/2014
(Continued)

OTHER PUBLICATIONS

English machine translation for CN105865685.*
English machine translation for CN108333328.*

*Primary Examiner* — Daniel S Larkin
*Assistant Examiner* — Anthony W Megna Fuentes
(74) *Attorney, Agent, or Firm* — Wayne & Ken, LLC; Tony Hom

(57) ABSTRACT

A three-dimensional analog simulation test system for gas-liquid countercurrent in an abandoned mine goaf includes a three-dimensional analog simulation device configured to simulate an analog environment of gas-liquid countercurrent in an abandoned mine goaf, a gas supply system, an automatic water pressure control system and a hydraulic loading system. The three-dimensional analog simulation device includes a reaction frame and a three-dimensional analog simulation chamber. The reaction frame includes a beam, a base and a column for connecting the beam and the base. The three-dimensional analog simulation chamber is arranged inside the reaction frame. The test system can be used to simulate the gas-liquid countercurrent in an abandoned mine goaf so as to study the evolution of water accumulation and gas enrichment in long-term abandonment of closed mines and the migration evolution rules of gas-liquid two-phase in abandoned mines with high gas density.

9 Claims, 2 Drawing Sheets

(51) Int. Cl.
*G05B 11/01* (2006.01)
*G05D 16/20* (2006.01)
*E21F 1/02* (2006.01)
*G01N 33/24* (2006.01)

(56) References Cited

FOREIGN PATENT DOCUMENTS

| | | | | |
|---|---|---|---|---|
| CN | 105865685 | A | * | 8/2016 |
| CN | 106092773 | A | * | 11/2016 |
| CN | 106814179 | A | * | 6/2017 |
| CN | 107014673 | A | | 8/2017 |
| CN | 108088978 | A | * | 5/2018 |
| CN | 108088982 | A | * | 5/2018 |
| CN | 108107186 | A | * | 6/2018 |
| CN | 108196034 | A | * | 6/2018 |
| CN | 108333328 | A | * | 7/2018 |
| CN | 108387456 | A | * | 8/2018 |
| CN | 108414727 | A | * | 8/2018 |
| CN | 108445193 | A | * | 8/2018 |

* cited by examiner

THREE-DIMENSIONAL ANALOG SIMULATION TEST SYSTEM FOR GAS-LIQUID COUNTERCURRENT IN ABANDONED MINE GOAF

CROSS-REFERENCE TO RELATED APPLICATIONS

This application claims the benefit of priority from Chinese Application No. 201811087726.8, filed on Sep. 18, 2018. The content of the aforementioned application, including any intervening amendments thereto, is incorporated herein by reference in its entirety.

TECHNICAL FIELD

The present disclosure relates to a simulation test system in an abandoned mine goaf, more particularly to a three-dimensional analog simulation test system for gas-liquid countercurrent in an abandoned mine goaf.

BACKGROUND

As China's coal resources are continuously mined at an increasing rate, a growing number of mines will be mined out and then abandoned. According to relevant experts, the number of abandoned mines in China will reach 12,000 in 2020 and 15,000 by 2030. The abandoned mines have abundant resources. It is preliminary estimated that the coal resources in the abandoned mines reach 42 billion tons and the coalbed methane resources reach nearly 500 billion $m^3$. There are a large number of abandoned mines with abundant resources and huge development potential in China. The development and utilization of these coalbed methane resources can not only make up for the shortage of natural gas resources in China, optimizing the energy structure, but also eliminate the pollution of gas flowing through the ground to the atmospheric environment. It can be seen that the utilization of gas in abandoned mines has considerable economic and environmental benefits.

However, the environment in the abandoned mine goaf is very complicated. After the coal mining, the overlying rock over the goaf will fall to form a "three zones" (caving zone, fractured zone and curve subsidence zone), and a large amount of residual coal remains in the mined-out area since the coal mining rate is relatively low. Gas is released from the residual coal continuously. The released gas continuously flows to the caving zone and the fractured zone. At the same time, there is accumulated water in the goaf, which is mainly formed by water in the upper aquifer continuously penetrating into the goaf through the fractured zone. The gas-water-rock forms the complex environment of solid-liquid-gas three-phase coexistence in the abandoned mine goaf, and the complex environment has an impact on the flow of gas and water in the abandoned mine. At present, the gas is mainly extracted from abandoned mines by means of ground drilling in China. The chief problem is to find out the occurrence of gas and water in abandoned mines, especially the evolution of the accumulated water and gas enrichment in long-term process in the closed mines with accumulated water and high density gas.

However, due to the complexity of geological structures and the diversity of mining conditions, the long-term migration and occurrence of gas and water in abandoned mines have become more complicated after the mines is closed. The remaining coal in the goaf is the main source of gas. The water source mainly exists in the upper aquifer of the goaf. The fractures in the goaf is the seepage channel of gas and water. The ascension migration of gas and the downward infiltration of water form the gas-liquid two-phase countercurrent in the goaf. The migration of gas and water determines the evolution of the accumulated water and gas enrichment in the goaf. Aiming at the problem of water-gas countercurrent flow in the abandoned mine goaf area, the existing single plane analog simulation system and the traditional analog simulation system in an anhydrous and gas-free environment are not in conformity with the actual engineering background and cannot meet the experimental requirements of gas-liquid two-phase countercurrent. Thus, it is urgent to design a three-dimensional analog simulation test system for gas-liquid countercurrent in the abandoned mine goaf, and to carry out an analog simulation test study on the liquid-gas migration evolution of the abandoned mine goaf in laboratory.

SUMMARY

Provided is a three-dimensional analog simulation test system for gas-liquid countercurrent in abandoned mine goaf, which is used for analog simulation of gas-liquid countercurrent in abandoned mine goaf to study the evolution of water accumulation and gas enrichment in long-term abandonment of closed mines and the migration evolution rules of gas-liquid two-phase of gas and water in abandoned mines with high gas density.

In order to achieve the above object, the present disclosure provides a three-dimensional analog simulation test system for gas-liquid countercurrent in an abandoned mine goaf, including a three-dimensional analog simulation device configured to simulate an analog environment of gas-liquid countercurrent in an abandoned mine goaf, a gas supply system, an automatic water pressure control system and a hydraulic loading system. The three-dimensional analog simulation device includes a reaction frame and a three-dimensional analog simulation chamber. The reaction frame includes a beam, a base and a column connecting the beam and the base. The three-dimensional analog simulation chamber is arranged in the reaction frame. In the three-dimensional analog simulation chamber, analog materials corresponding to formation conditions of the mine to be simulated are uniformly laid upwardly from bottom of the chamber. An excavation operation is carried out after drying. A fractured structure with a "vertical three-zone" and a "horizontal three-zone" is formed in the goaf after the excavation. The vertical three-zone includes a curved subsidence zone, a fractured zone and a caving zone. The horizontal three-zone includes a coal seam support zone, a separation zone, and a re-compaction zone. The gas supply system includes a gas supply pipe and a gas cylinder configured to provide gas to the gas supply pipe. The gas supply pipe is pre-embedded in the three-dimensional analog simulation chamber and arranged below the goaf. The gas supply pipe is uniformly provided with a plurality of first nozzles facing the goaf. The hydraulic pressure control system includes a buffer tank, a pressure sensor, a nitrogen cylinder, a water supply tank, a water pressure test pump, a water supply pipe and an electronic controller. A top of the buffer tank is connected to a first interface of a four-way joint, and a bottom of the buffer tank is connected to a first interface of a three-way joint. The pressure sensor is connected to a second interface of the four-way joint. The nitrogen cylinder is connected to a third interface of the four-way joint through a gas pipe. An inlet of the water pressure test pump is connected to the water supply tank through a first water pipe. An outlet of the water pressure test pump is connected to a second interface of the three-way joint through a second water pipe. The water supply pipe is pre-embedded in the three-dimensional analog simulation chamber, and is arranged above the goaf, and a plurality of second nozzles facing the goaf are evenly arranged on the water supply pipe and connected to a third interface of the three-way joint through the third water pipe. The third water pipe between the water supply pipe and the three-way joint is provided with a stop valve I. The electronic controller is electrically connected to the pressure sensor and the circuit breaker of the water pressure test pump, respectively, receiving a detected value of the pressure sensor and comparing the detected value with a preset value to control an opening or closing of the water pressure test pump. The hydraulic loading system includes a bearing plate, a loading pressure head, a hydraulic pump, a hydraulically loading control cabinet configured to provide a pressure to the loading pressure head and control the pressure, and a motor configured to provide power to the hydraulic pump. The bearing plate is overlaid on a top of the a rock strata mimic. The loading pressure head passes through a mounting hole in the beam on the reaction frame and abuts against the bearing plate, and connected to the hydraulic loading control cabinet through a first hydraulic pipe. The hydraulic pump is connected to the hydraulic loading control cabinet through a second hydraulic pipe.

Further, the three-dimensional analog simulation chamber is a rectangular chamber with a top opening, and is provided with a transparent visible viewing window.

Further, a side surface of the three-dimensional analog simulation chamber is formed by connecting a plurality of baffles through fasteners; the viewing window is mounted on the baffle.

Further, the gas supply system further includes a gas storage tank provided on a gas pipe between the gas supply pipe and the gas cylinder.

Further, the gas supply system further includes a gas flowmeter provided on a gas pipe between the gas cylinder and the gas storage tank.

Further, the gas supply system further includes a gas pressure reducing valve provided on a gas pipe between the gas cylinder and the gas flowmeter.

Further, the automatic water pressure control system further comprises a nitrogen pressure reducing valve provided on a pipe between the nitrogen cylinder and the four-way joint.

Further, a fourth interface of the four-way joint is provided with an exhaust pipe; the exhaust pipe is provided with an exhaust valve.

Further, the pressure sensor is an intelligent digital-display pressure gauge; the electronic controller is a relay; and the circuit breaker is an air circuit breaker.

The gas-liquid countercurrent three-dimensional analog simulation test system of the present invention has the following advantages and positive effects compared to the prior art:

(1) The three-dimensional analog simulation test system adopts a hydraulic loading system and a reaction frame structure for overburden pressure loading. The automatic water pressure control system and the gas supply system simultaneously realize analog simulation of the aquifer and gas reservoirs. As an analog simulation device for indoor abandoned mines, it is more in line with the actual situation;

(2) The automatic water pressure control system was independently developed by the inventors. The pressure sensor and the electronic controller are adopted to control the opening and closing of the pressure test pump to stabilize the water pressure, achieving the purpose of water pressure automatic control, realizing closed-loop automatic control, saving labor costs. Thus, the automatic water pressure control system is more stable and reliable than other pressurized manner and is not affected by the environment. It can meet requirements of different water pressure.

(3) The three-dimensional analog simulation chamber having a transparent visible viewing side is able to realize visualization, which can not only simulate the final state of the gas-liquid occurrence in an abandoned mine, but also record the entire process from the beginning of the seepage to the occurrence stabilization, so that the main seepage channel of the water/gas and the final occurrence space are identified;

(4) The test system can be used to explore the problem of migration and occurrence stability of gas and groundwater in abandoned mines, and reveal the process from the closure of the mines to the occurrence stabilization of gas and groundwater in abandoned mines with high gas density, as well as the final state thereof, provide reference for the extraction of gas and treatment of groundwater in the abandoned mines;

(5) By using the test system for gas-liquid countercurrent in the abandoned mine goaf, and the test results as a reference, the cost of the gas extraction enterprises, particularly the extraction cost of enterprises that extract deep mines with high gas density by ground drilling can be greatly reduced, the economic benefits of enterprises are improved and enterprises pressure is eased.

Figure 1:
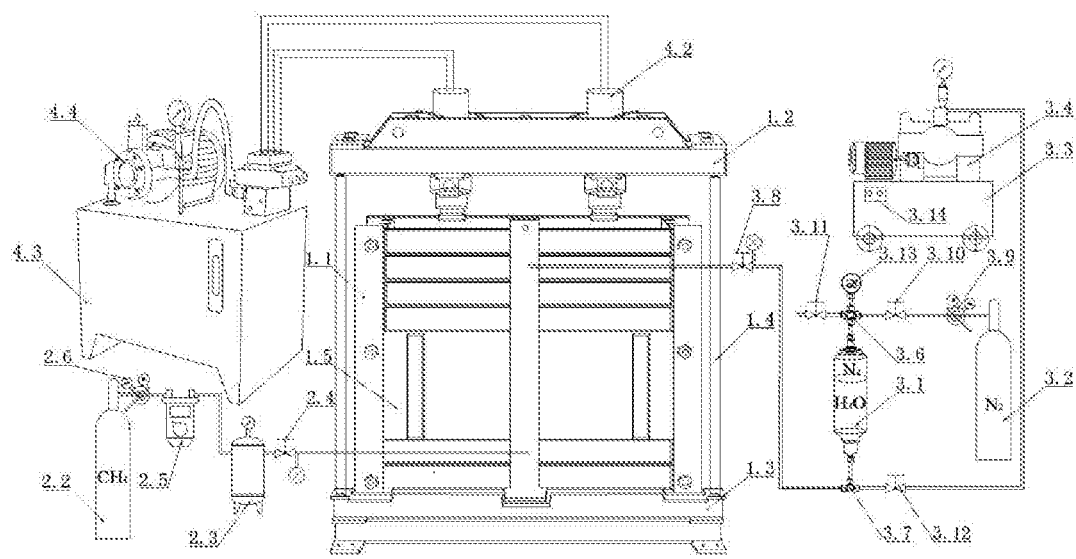
FIG. 1 is a schematic diagram of a three-dimensional analog simulation test system for gas-liquid countercurrent in an abandoned mine goaf according to an embodiment of the present invention.

REFERENCE NUMERALS 1.1, three-dimensional analog simulation chamber; 1.2, beam; 1.3, base; 1.4, column; 1.5, viewing window; 2.1, gas supply pipe; 2.2, gas cylinder; 2.3, gas storage tank; 2.4, stop valve II; 2.5, gas flowmeter; 2.6, gas pressure reducing valve; 3.1, buffer tank; 3.2, nitrogen cylinder; 3.3, water supply tank; 3.4, water pressure test pump; 3.5, water supply pipe; 3.6, four-way joint; 3.7, tee-way joint; 3.8, stop valve I; 3.9, nitrogen pressure reducing valve; 3.10, ball valve I; 3.11, exhaust valve; 3.12, ball valve II; 3.13, intelligent digital-display pressure gauge; 3.14, air circuit breaker; 4.1, bearing plate; 4.2, loading pressure head; 4.3, hydraulic loading control cabinet; 4.4, plunger pump; 101, curve subsidence zone; 102, fractured zone; 103, caving zone; 104, bottom plate I; 105, brick layer; 106, bottom plate II; 107, gas supply layer; 108, permeable layer; 109, aquifer; 110, topsoil layer; A, coal seam support zone; B, separation zone; C, re-compaction zone.

DETAILED DESCRIPTION OF EMBODIMENTS

Embodiment 1

Figure 2:
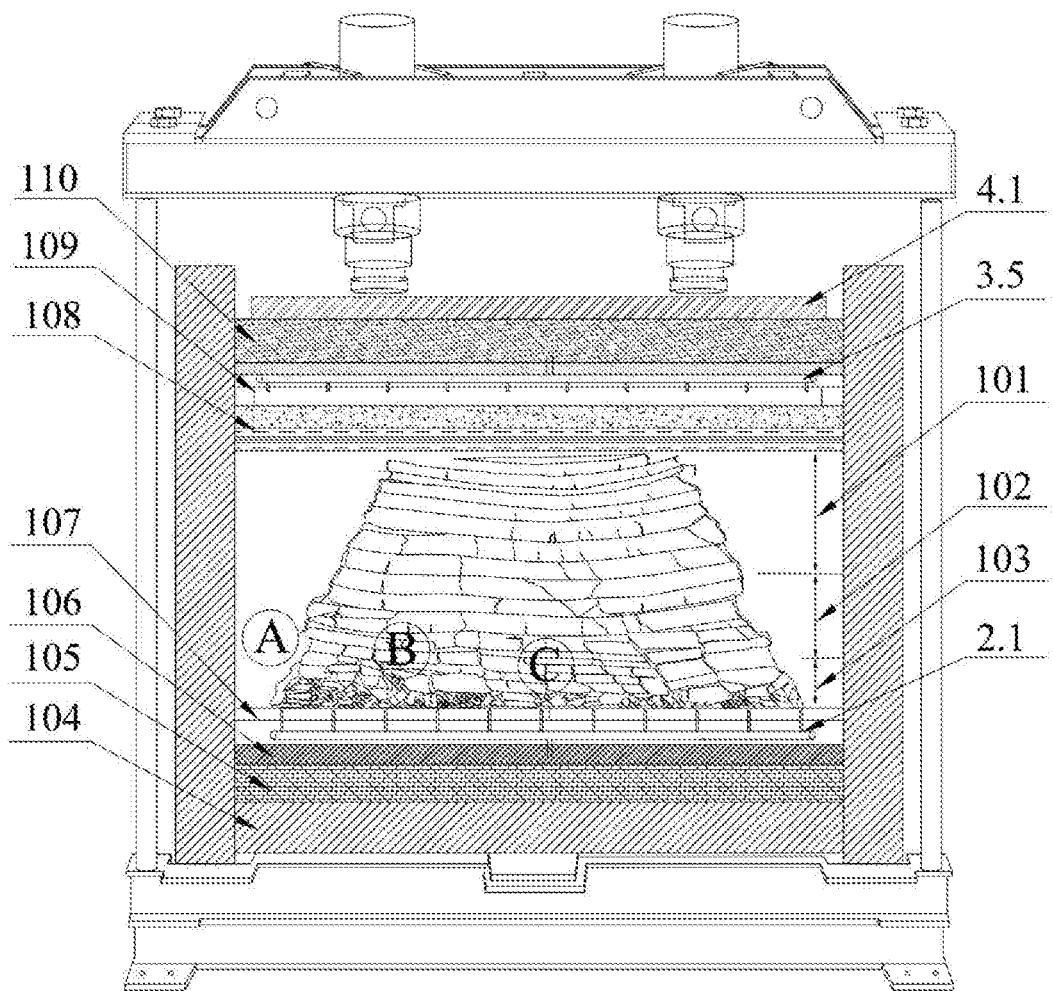
FIG. 2 is a schematic diagram showing arrangement of a gas supply pipe, a water supply pipe and a bearing plate in a three-dimensional analog simulation test system for gas-liquid countercurrent in the abandoned mine goaf in FIG. 1.

The present embodiment provides a three-dimensional analog simulation test system for gas-liquid countercurrent in an abandoned mine goaf, as shown in FIG. 1 and FIG. 2, including a three-dimensional analog simulation device configured to simulate an analog environment of gas-liquid countercurrent in an abandoned mine goaf, a gas supply system, an automatic water pressure control system and a hydraulic loading system. The three-dimensional analog simulation device includes a reaction frame and a three-dimensional analog simulation chamber 1.1. The reaction frame includes a beam 1.2, a base 1.3 and column 1.4 connecting the beam 1.2 and the base 1.3. The three-dimensional analog simulation chamber 1.1 is arranged in the reaction frame. In the three-dimensional analog simulation chamber 1.1, analog materials corresponding to the formation conditions of the required simulated mine are uniformly laid upwardly from the bottom of the chamber 1.1. The excavation operation is carried out after drying. A fractured structure with a "vertical three-zone" (vertically divided into a curved subsidence zone 101, a fractured zone 102 and a caving zone 103) and a "horizontal three-zone" (horizontally divided into a coal seam support zone A, a separation zone B, and a re-compaction zone C) is formed in the goaf after the excavation. The gas supply system includes a gas supply pipe 2.1 and a gas cylinder 2.2 configured to provide gas to the gas supply pipe 2.1. The gas supply pipe 2.1 is pre-embedded in the three-dimensional analog simulation chamber, and is arranged below the goaf. The gas supply pipe is uniformly provided with a plurality of nozzles facing the goaf. The nozzles, in one aspect, play a role of uniformly infiltrating gas, and in the other aspect, prevent the analog materials from blocking the gas supply pipe 2.1. The hydraulic pressure control system includes a buffer tank 3.1, a pressure sensor, a nitrogen cylinder 3.2, a water supply tank 3.3, a water pressure test pump 3.4, a water supply pipe 3.5 and an electronic controller. A top of the buffer tank 3.1 is connected to a first interface of a four-way joint 3.6, a bottom thereof is connected to a first interface of a three-way joint 3.7. The pressure sensor is connected to a second interface of the four-way joint 3.6. The nitrogen cylinder 3.2 is connected to a third interface of the four-way joint 3.6 through a gas pipe. An inlet of the water pressure test pump 3.4 is connected to the water supply tank 3.3 through a first water pipe. An outlet of the water pressure test pump 3.4 is connected to a second interface of the three-way joint 3.7 through a second water pipe. The water supply pipe 3.5 is pre-embedded in the three-dimensional analog simulation chamber, and is arranged above the goaf, and a plurality of nozzles facing the goaf are uniformly arranged on the water supply pipe. The nozzles, in one aspect, play a role of uniformly infiltrating gas, and in the other aspect, prevent the analog materials from blocking the water supply pipe 3.5. The nozzles are connected to a third interface of the three-way joint 3.7 through the water supply pipe. A third water pipe between the water supply pipe 3.5 and the three-way joint 3.7 is provided with a stop valve I 3.8. The electronic controller is electrically connected with the pressure sensor and the circuit breaker of the water pressure test pump 3.4 respectively. The electronic controller is configured to receive a detection value of the pressure sensor and compare the detection value with a preset value so as to control the opening or closing of the water pressure test pump 3.4. The hydraulic loading system includes a bearing plate 4.1, a loading pressure head 4.2, a hydraulic pump, a hydraulically loading control cabinet 4.3 configured to provide a pressure to the loading pressure head 4.2 and control the pressure, and a motor configured to provide power to the hydraulic pump. The bearing plate 4.1 is overlaid on top of a rock strata mimic. The loading pressure head 4.2 passes through a mounting hole on the beam 1.2 and abuts against the bearing plate 4.1, and is connected to the hydraulic loading control cabinet 4.3 through a hydraulic pipe. The hydraulic pump is connected to the hydraulic loading control cabinet 4.3 through the hydraulic pipe.

Analog materials such as sand, lime and gypsum are prepared before test. Air tightness of each system and pipe is checked. Analog materials are laid layer by layer from the bottom of the three-dimensional analog simulation chamber 1.1 according to the formation conditions and similarity ratio of the mine to be simulated so as to form a rock strata mimic. The top of the rock strata mimic is then applied with a pressure through the reaction frame. The hydraulic loading system is activated, so that the loading pressure head 4.2 uniformly applies pressure to the rock strata through the bearing plate 4.1. When each of rock strata is dried after a few days, the excavation operation is carried out. After the excavation, the fractured structure of the "vertical three-zone" and the "horizontal three-zone" is formed in the goaf area. Then the gas supply pipe 2.1 is connected to the gas pipe of the gas supply system, and the water supply pipe 3.5 is connected to the third water pipe of the automatic water pressure control system to perform a gas-liquid two-phase countercurrent simulation test. Wherein, how to lay the analog materials in the three-dimensional analog simulation chamber 1.1 and how to carry out excavation work after drying, those skilled in the art can design and operate according to the formation conditions of the simulated mine, and the specific process will not be described again. The hydraulic loading control cabinet 4.3 provides pressure to the loading pressure head 4.2 and controls the pressure. The specific structure is designed by a person skilled in the relevant art or purchased on the market according to the test requirements. In the buffer tank 3.1 of the automatic water pressure control system, nitrogen is in an upper part and water is at the bottom. After the nitrogen is compressed, a certain pressure is formed above the water surface, and is monitored and controlled by the pressure sensor arranged above the buffer tank 3.1. The preset value of the pressure is input into the electronic controller, when the detected value of the pressure sensor reaches the preset value of the electronic controller, the electronic controller controls the circuit breaker of the water pressure test pump 3.4 to be cut off. The water pressure test pump 3.4 no longer fills the pressure tank 3.1. Then the stop valve I 3.8 is opened, the water in the buffer tank 3.1 enters the water supply pipe 3.5 along the third water pipe under the action of the nitrogen pressure. As the water level in the buffer tank 3.1 decreases, the nitrogen space above the water surface increases, and then the detected value of the pressure sensor is lowered. When the detected value is lower than the preset value of the electronic controller, the electronic controller controls the circuit breaker of the pressure test water pump 3.4 to be closed. The pressure test water pump 3.4 refills the buffer tank 3.1, until the detected value of pressure sensor reaches the preset value of the electronic controller once again. In this way, the water pressure test pump 3.4 is controlled to start and stop by the pressure sensor and the electronic controller, so that the water pressure is stabilized, and the purpose of self-control of the water pressure is achieved.

Further, as shown in FIG. 1, the three-dimensional analog simulation chamber 1.1 is a rectangular chamber with a top opening, and is provided with a transparent visible viewing window 1.5. The visualization is realized. Not only the final state of the gas-liquid occurrence in an abandoned mine can be simulated, but also the entire process from the beginning of the seepage to the occurrence stabilization can be recorded, so that the main seepage channel of the water/gas and the actual occurrence space are identified.

Further, as shown in FIG. 1, a side surface of the three-dimensional analog simulation chamber 1.1 is formed by connecting a plurality of baffles through fasteners. The viewing window 1.5 is arranged on the baffle. The rock strata are laid layer by layer from the bottom to the top. As the height of rock strata increased, the baffles are added accordingly, until the laying is completed.

In the present embodiment, a non-observation side is formed by a plurality of channel steels connected with each other via bolting, and an observation side is formed by a plurality of perspex sheets arranged on the channel steels by high-strength bolts.

Further, as shown in FIG. 1, the gas supply system further includes a gas storage tank 2.3 provided on the gas pipe between the gas supply pipe 2.1 and the gas cylinder 2.2. The gas storage tank 2.3 is configured to temporarily store the gas. Before the test, the gas is injected into the gas storage tank 2.3. When a certain pressure in the gas storage tank 2.3 is reached, the valve on the gas cylinder 2.2 is closed. The stop valve II 2.4 between the gas storage tank 2.3 and the three-dimensional analog simulation chamber 1.1 is opened during the test, and the gas in the gas storage tank 2.3 is introduced into the goaf through the gas supply pipe 2.1, thereby providing a gas source.

Further, as shown in FIG. 1, the gas supply system further includes a gas flowmeter 2.5 provided on the gas pipe between the gas cylinder 2.2 and the gas storage tank 2.3 to prevent moisture in the three-dimensional analog simulation chamber 1.1 from entering the gas flow meter 2.5.

Further, as shown in FIG. 1, the gas supply system further includes a gas pressure reducing valve 2.6 provided on the gas pipe between the gas cylinder 2.2 and the gas flowmeter 2.5 to adjust the gas pressure.

Further, as shown in FIG. 1, the automatic water pressure control system further includes a nitrogen pressure reducing valve 3.9 provided on a pipe between the nitrogen cylinder 3.2 and the four-way joint 3.6 to adjust the nitrogen pressure.

Further, as shown in FIG. 1, a ball valve I 3.10 is provided on a gas pipe between the four-way joint 3.6 and the nitrogen pressure reducing valve 3.9 to cut off the nitrogen or adjust the nitrogen flow rate.

Further, as shown in FIG. 1, an exhaust pipe is provided on a fourth interface of the four-way joint 3.6 and is provided with an exhaust valve 3.11. The exhaust valve 3.11 is opened to discharge the nitrogen in the buffer tank 3.1. In the present embodiment, the exhaust valve 3.11 is a ball valve.

Further, as shown in FIG. 1, a ball valve II 3.12 is provided on a second water pipe between the water pressure test pump 3.4 and the three-way joint 3.7 to cut off water or adjust the water flow rate.

Further, as shown in FIG. 1, the pressure sensor is an intelligent digital-display pressure gauge 3.13. The electronic controller is a relay. The circuit breaker is an air circuit breaker 3.14. The four-way joint 3.6, the three-way joint 3.7, and the ball valve are all ferrule-type. The bearing plate 4.1 is a steel plate. The hydraulic pump is a plunger pump 4.4.

Embodiment 2

The present embodiment bases on the three-dimensional analog simulation test system for gas-liquid countercurrent in the abandoned mine goaf described in Embodiment 1. In this embodiment, the analog materials are laid in the three-dimensional analog simulation chamber 1.1 to form a specific rock strata mimic. As shown in FIG. 2, starting from the bottom, the bottom plate I 104, the brick layer 105, the bottom plate II 106, the gas supply layer 107 (gas supply pipe 3.5 is pre-embedded therein), the coal rock layer, the permeable layer 108, the aquifer 109 (water supply pipe 3.5 is pre-embedded) and the topsoil layer 110 are shown in turn. Excavation in the coal rock strata is made to form a goaf.

Specifically, the size of the three-dimensional analog simulation chamber 1.1 is 3×2.5×5 m³, and the pipelines of the system are all made of high-pressure stainless steel pipe with a thickness of 3 mm. The joint parts, such as ferrule type ball valve, the ferrule type three-way joint, the ferrule type four-way joint, etc. are coupled through the pipelines. The joint parts are tightened by the screws. Then, the sealing of the entire system is checked by applying lather.

It can be appreciated that for one of ordinary skill in the art, improvements or variations can be made based on the above descriptions, and these improvements and variations fall within the scope of the appended claims.

The embodiments are only illustrative of the present disclosure, and apparently the implementations are not limited by the above modes. The embodiments described herein and various modifications based on the spirit of the present disclosure fall within the scope of the present application.

What is claimed is:

1. A three-dimensional analog simulation test system for gas-liquid countercurrent in an abandoned mine goaf, comprising: a three-dimensional analog simulation device configured to simulate an analog environment of gas-liquid countercurrent in an abandoned mine goaf, a gas supply system, an automatic water pressure control system, and a hydraulic loading system; wherein the three-dimensional analog simulation device comprises a reaction frame and a three-dimensional analog simulation chamber; the reaction frame comprises a beam, a base, and a column configured to connect the beam and the base; the three-dimensional analog simulation chamber is provided in the reaction frame; wherein analog materials corresponding to a formation condition of a mine to be simulated are uniformly laid in the three-dimensional analog simulation chamber upwardly from a bottom of the chamber; an excavation operation is carried out after the analog materials are dry; a fractured structure with a "vertical three-zone" and a "horizontal three-zone" is formed in the goaf after the excavation; wherein the vertical three-zone comprises a curved subsidence zone, a fractured zone and a caving zone; the horizontal three-zone comprises a coal seam support zone, a separation zone, and a re-compaction zone; the gas supply system comprises a gas supply pipe and a gas cylinder configured to supply gas to the gas supply pipe; the gas supply pipe is pre-embedded in the three-dimensional analog simulation chamber and arranged below the goaf; the gas supply pipe is uniformly provided with a plurality of first nozzles facing the goaf; the automatic water pressure control system comprises a buffer tank, a pressure sensor, a nitrogen cylinder, a water supply tank, a water pressure test pump, a water supply pipe and an electronic controller; a top of the buffer tank is connected to a first interface of a four-way joint, and a bottom of the buffer tank is connected to a first interface of a three-way joint; the pressure sensor is connected to a second interface of the four-way joint; the nitrogen cylinder is connected to a third interface of the four-way joint through a gas pipe; an inlet of the water pressure test pump is connected to the water supply tank through a first water pipe, and an outlet of the water pressure test pump is connected to a second interface of the three-way joint through a second water pipe; the water supply pipe is pre-embedded in the three-dimensional analog simulation chamber and arranged above the goaf; the water supply pipe is uniformly provided with a plurality of second nozzles facing the goaf; the plurality of second nozzles are connected to a third interface of the three-way joint through a third water pipe; a stop valve is arranged on the third water pipe between the water supply pipe and the three-way joint; the electronic controller is electrically connected to the pressure sensor and a circuit breaker of the water pressure test pump respectively, receiving a detected value of the pressure sensor and comparing the detected value with a preset value to control an opening or closing of the water pressure test pump; the hydraulic loading system comprises a bearing plate, a loading pressure head, a hydraulic pump, a hydraulic loading control cabinet configured to provide a pressure to the loading pressure head and control the pressure, and a motor configured to provide power to the hydraulic pump; the bearing plate is overlaid on a top of a rock strata mimic; the loading pressure head passes through a head mounting hole on the beam of the reaction frame and abuts against the bearing plate, and is connected to the hydraulic loading control cabinet through a first hydraulic pipe; the hydraulic pump is connected to the hydraulic loading control cabinet through a second hydraulic pipe.

2. The three-dimensional analog simulation test system of claim 1, wherein the three-dimensional analog simulation chamber is a rectangular chamber with a top opening, and is provided with a transparent viewing window.

3. The three-dimensional analog simulation test system of claim 2, wherein a side surface of the three-dimensional analog simulation chamber is formed by connecting a plurality of baffles through fasteners; and the viewing window is arranged on one of the plurality of baffles.

4. The three-dimensional analog simulation test system of claim 1, wherein the gas supply system further comprises a gas storage tank on a gas pipe between the gas supply pipe and the gas cylinder.

5. The three-dimensional analog simulation test system of claim 4, wherein the gas supply system further comprises a gas flowmeter on a gas pipe between the gas cylinder and the gas storage tank.

6. The three-dimensional analog simulation test system of claim 5, wherein the gas supply system further comprises a gas pressure reducing valve on a gas pipe between the gas cylinder and the gas flowmeter.

7. The three-dimensional analog simulation test system of claim 1, wherein the automatic water pressure control system further comprises a nitrogen pressure reducing valve on a gas pipe between the nitrogen cylinder and the four-way joint.

8. The three-dimensional analog simulation test system of claim 1, wherein a fourth interface of the four-way joint is provided with an exhaust pipe; and the exhaust pipe is provided with an exhaust valve.

9. The three-dimensional analog simulation test system of claim 1, wherein the pressure sensor is a digital-display pressure gauge; the electronic controller is a relay; and the circuit breaker is an air circuit breaker.

* * * * *